US011241705B2

(12) United States Patent
Simard

(10) Patent No.: US 11,241,705 B2
(45) Date of Patent: Feb. 8, 2022

(54) FLUID METERING AND DISPENSER DEVICE

(71) Applicant: Jo-Anne Simard, Terrebonne (CA)

(72) Inventor: Jo-Anne Simard, Terrebonne (CA)

( * ) Notice: Subject to any disclaimer, the term of this patent is extended or adjusted under 35 U.S.C. 154(b) by 36 days.

(21) Appl. No.: 16/212,589

(22) Filed: Dec. 6, 2018

(65) Prior Publication Data

US 2019/0329276 A1 Oct. 31, 2019

(30) Foreign Application Priority Data

Dec. 10, 2017 (GB) .................................. 1720561

(51) Int. Cl.
*B05B 11/00* (2006.01)
*G01F 11/28* (2006.01)
*B65D 41/26* (2006.01)

(52) U.S. Cl.
CPC .......... *B05B 11/3042* (2013.01); *B65D 41/26* (2013.01); *G01F 11/28* (2013.01)

(58) Field of Classification Search
CPC ...... G01F 11/261; G01F 11/26; G01F 11/262; G01F 11/266; G01F 11/268; B05B 11/3042; B05B 11/3052; B65D 41/26
See application file for complete search history.

(56) References Cited

U.S. PATENT DOCUMENTS

| | | | | |
|---|---|---|---|---|
| 1,914,766 A | * | 6/1933 | Zaloschan | G01F 11/263 222/452 |
| 2,864,538 A | * | 12/1958 | Rasmussen | G01F 11/12 222/453 |
| 3,029,001 A | * | 4/1962 | Blish | B05B 11/04 222/207 |
| 3,379,136 A | * | 4/1968 | Corsette | B05B 11/0059 417/313 |
| 3,756,474 A | * | 9/1973 | Riccio | B05B 11/06 222/635 |
| 3,919,455 A | * | 11/1975 | Sigdell | G01F 23/242 73/226 |
| 4,143,794 A | * | 3/1979 | Stratford | G01F 11/286 222/205 |
| 4,418,843 A | * | 12/1983 | Jackman | G01F 19/00 222/158 |
| 4,474,312 A | * | 10/1984 | Donoghue | G01F 11/286 222/205 |
| 4,607,762 A | * | 8/1986 | Zulauf | B65D 1/323 222/48 |

(Continued)

*Primary Examiner* — Patrick M. Buechner

(57) ABSTRACT

A fluid measuring and dispensing device comprises a bottle engaging element having a bottom portion configured for removably sealably engaging the mouth of the bottle, a fluid container movably mounted on a top portion of a bottle engaging element and defining a fluid chamber, and a mist spray pump connected to the fluid container and having a fluid input port in fluid communication with the chamber. The fluid container is movable between a first position and a second position relative to the bottle engaging element. When the fluid container is in the first position, the chamber is sealed from the interior of the bottle. And when the fluid container is in the second position, at least one passageway extends throughout a bottom wall of the fluid container and throughout the bottle engaging element respectively, such that the chamber is in fluid communication with the interior of the bottle.

1 Claim, 7 Drawing Sheets

(56) References Cited

U.S. PATENT DOCUMENTS

| | | | | |
|---|---|---|---|---|
| 4,747,521 | A * | 5/1988 | Saffron | G01F 11/286 |
| | | | | 222/205 |
| 4,830,226 | A * | 5/1989 | Kong | B67D 7/0216 |
| | | | | 222/205 |
| 5,174,478 | A * | 12/1992 | Reyman | B67D 1/0001 |
| | | | | 222/207 |
| 5,330,081 | A * | 7/1994 | Davenport | B65D 1/323 |
| | | | | 222/207 |
| 5,392,966 | A * | 2/1995 | Bunin | G01F 11/262 |
| | | | | 222/434 |
| 5,584,420 | A * | 12/1996 | Awada | G01F 11/263 |
| | | | | 222/153.09 |
| 5,833,124 | A * | 11/1998 | Groves | G01F 11/286 |
| | | | | 222/158 |
| 5,967,377 | A * | 10/1999 | Glynn | B05B 11/3004 |
| | | | | 222/158 |
| 6,330,960 | B1 * | 12/2001 | Faughey | B65D 50/045 |
| | | | | 222/158 |
| 6,334,550 | B1 * | 1/2002 | De Backer | G01F 11/286 |
| | | | | 222/205 |
| 6,923,344 | B1 * | 8/2005 | Chien | G01F 11/286 |
| | | | | 222/158 |
| 7,097,071 | B2 * | 8/2006 | Anderson | G01F 11/286 |
| | | | | 222/1 |
| 7,748,579 | B1 * | 7/2010 | Shin | G01F 11/261 |
| | | | | 222/450 |
| 2002/0027144 | A1 * | 3/2002 | Lacout | G01F 11/262 |
| | | | | 222/321.5 |
| 2002/0066749 | A1 * | 6/2002 | De Laforcade | G01F 11/262 |
| | | | | 222/129 |
| 2003/0116589 | A1 * | 6/2003 | De Laforcade | A45D 34/02 |
| | | | | 222/321.9 |

\* cited by examiner

FLUID METERING AND DISPENSER DEVICE

FIELD OF THE INVENTION

The present invention relates generally to fluid metering and dispensing devices and, more particularly, to a fluid metering and dispensing device having a bottom portion thereof sealably engageable on the mouth of a bottle containing a fluid, such as typically an olive oil bottle or the like.

BACKGROUND OF THE INVENTION

Fluid metering and dispensing devices typically used around the kitchen for preparing food are known and are generally represented in various forms on the market such as, for example, the known household measuring jugs, cups and spoons, as well as spray pump dispensers provided with a graduated transparent container.

While these known fluid metering and dispensing devices may be usable for measuring and dispensing a predetermined amount of fluid, they are generally cumbersome to use since precise manipulations of both the fluid metering and dispensing device and a bottle of fluid are often required during the preparation of food portions in order to dispense only the desired amount of fluid. These precise manipulations can be tiresome when they have to be repeated at most meals.

Furthermore, these known fluid metering and dispensing devices often end up occupying precious space on a typically crowded food preparation surface, such as a kitchen table or counter, since both the fluid metering and dispensing device and a bottle of fluid, such as an olive oil bottle, must be kept at hand when preparing food portions.

These disadvantages of known fluid metering and dispensing devices may be annoying, particularly for someone having to observe a strict food diet in which relatively precise volumes of fluid must be often measured and dispensed on or in prepared diet food portions.

Thus there is a need in the industry for an improved fluid metering and dispensing device that avoids the aforementioned disadvantages. In a broad aspect, the present invention provides such an improved fluid metering and dispensing device.

SUMMARY OF THE INVENTION

The present invention describes a fluid metering and dispensing device usable with a bottle, jar or like container containing a fluid, for dispensing a substantially precisely measured amount of the fluid.

In an embodiment, the device comprises a bottle engaging element having a bottom portion configured for removably sealably engaging the mouth of the bottle.

The device further comprises a fluid container defining a fluid chamber dimensioned for containing a predetermined amount of fluid to be dispensed. The fluid container is movably mounted on a top portion of the bottle engaging element. Furthermore, the fluid container is movable between a first position and a second position relative to the bottle engaging element.

The device further comprises a fluid dispensing means connected to the fluid container and having a fluid input port in fluid communication with the chamber of the fluid container.

Furthermore, when the fluid container is in the first position, the interior of the chamber of the fluid container is sealed from the interior of the bottle. And when the fluid container is in the second position, at least one passageway extends throughout a bottom wall of the fluid container and throughout the bottle engaging element respectively, such that the interior of the chamber is in fluid communication with the interior of the bottle.

In various embodiments of the invention, the bottom portion of the bottle engaging element bottom portion is suitably shaped and sized for sealably engaging one of a threaded mouth of a bottle, a ringed mouth of a bottle, or the mouth opening of a bottle in a cork-like fashion.

In various embodiments of the invention, the fluid dispensing means is one of a manually operated mist spray pump, a manually operated trigger spray pump or an oil pourer spout including a vent tube and a removable stopper cap.

Preferably, the predetermined volume of fluid is equivalent to a table spoon. Other predetermined volumes of fluid are also possible such as, for example, one tea spoon, one fluid ounce and one centiliter.

In other embodiments of the invention, the volume of fluid that may be stored in the chamber of the fluid container is more than the predetermined volume of fluid described above, with the fluid container being made of a transparent or translucent material and graded with fluid measuring indicia's.

Thus, once the chamber is filled with fluid and the bottle is oriented in an upright attitude, the fluid container may be momentarily moved back to the container fluid open position so as to allow the volume of fluid therein to gradually decrease to a desired amount, as indicated through the fluid measuring indicia's.

Thus, there has been described various embodiments of a fluid metering and dispensing device that is relatively simple and easy to use for measuring and dispensing a predetermined amount of fluid. The present invention also describes various embodiments of a fluid metering and dispensing device that occupies less space when compared to known fluid metering and dispensing devices of the prior art, which are generally cumbersome to use.

Other advantages, novel features and alternate embodiments of the present invention will be more apparent from the following drawings and detailed description.

DETAILED DESCRIPTION OF THE INVENTION

Figure 1:
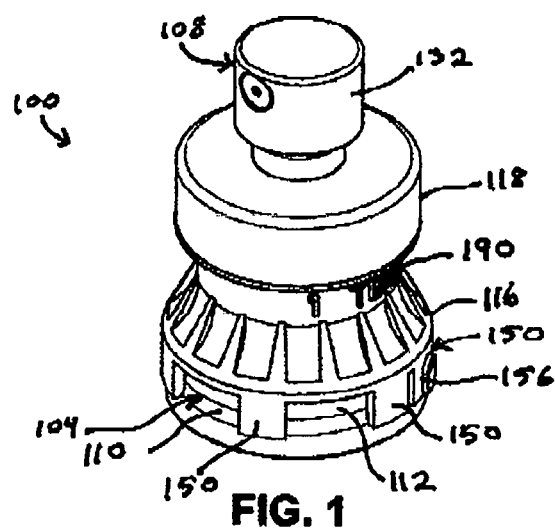
FIG. 1, in a top perspective view, illustrates an embodiment of a fluid metering and dispensing device, according to the present invention, here shown including a mist spray pump.
Figure 2:
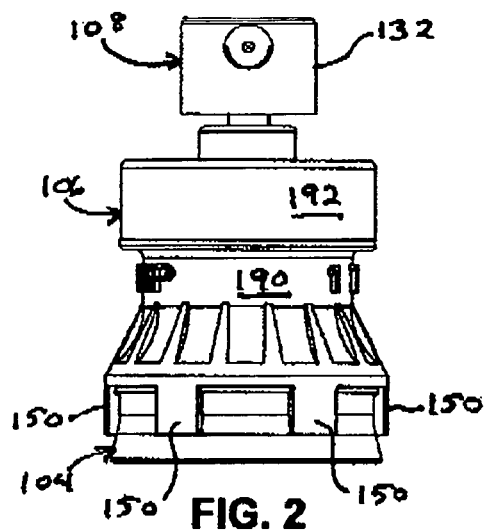
FIG. 2, in a front elevational view, illustrates the fluid metering and dispensing device in FIG. 1.
Figure 3:
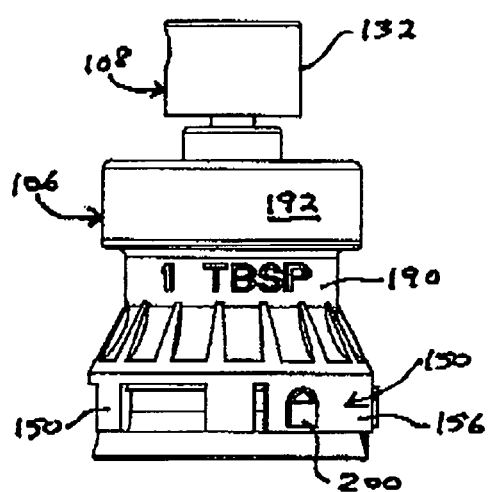
FIG. 3, in a side elevational view, illustrates the fluid metering and dispensing device in FIG. 1.

FIGS. 1 to 26 inclusively, illustrates an embodiment, according to the present invention, of a fluid measuring and dispensing device 100 for use with a bottle 300 containing a fluid.

Referring more particularly to FIGS. 1 to 7, the device 100 comprises a bottle engaging element 104 having a bottom portion 110 configured for removably sealably engaging the mouth of the bottle 300.

The device 100 further comprises a fluid container 106 defining a fluid chamber 120 dimensioned for containing a predetermined amount of fluid to be dispensed. The fluid container 106 is movably mounted on a top portion 112 of the bottle engaging element 104.

Furthermore, the fluid container 106 is movable between a first position and a second position relative to the bottle engaging element 104.

The device 100 further comprises a fluid dispensing means 108 connected to the fluid container 106 and having a fluid input port 136 in fluid communication with the chamber 120 of the fluid container 106.

Figure 31:
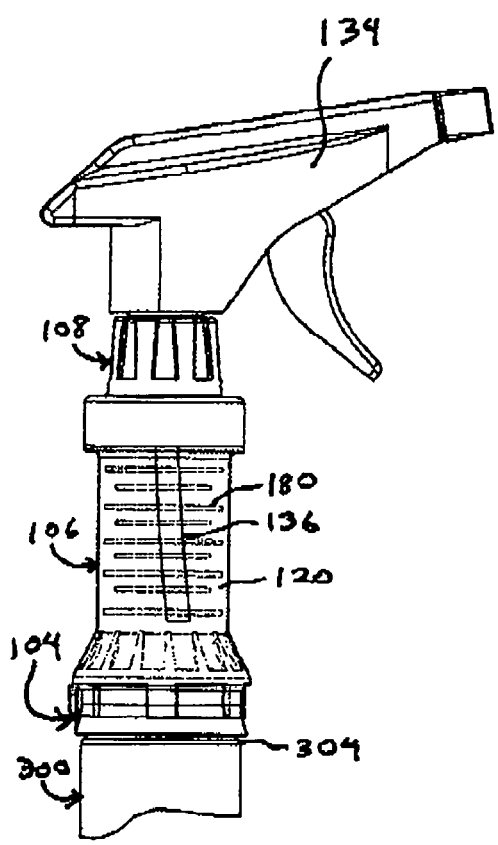
FIG. 31, in a side elevational view, illustrates another embodiment of a fluid metering and dispensing device, according to the present invention, here shown including a trigger spray pump and engaged on the mouth of a bottle.
Figure 32:
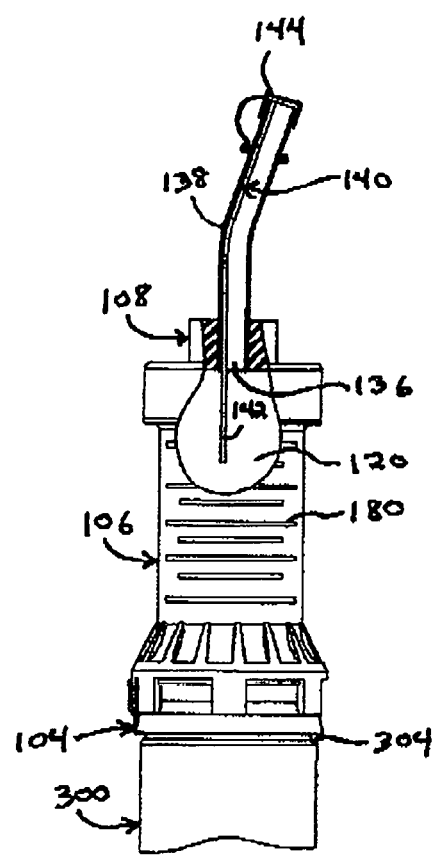
FIG. 32, in a side elevational view, illustrates yet another embodiment of a fluid metering and dispensing device, according to the present invention, here shown including an oil pouring spout and engaged on the mouth of a bottle.

For example, as illustrated in various embodiments of the invention in FIGS. 1, 31 and 32, the fluid dispensing means 108 may be connected to a top portion of the fluid container 106. As would be obvious to someone familiar in the art, other positions of the fluid dispensing means 108 relative to the fluid container 106 are also possible.

Furthermore, as illustrated again in various embodiments of the invention in FIGS. 7, 30, 31 and 32, depending on the known type of fluid dispensing means 108, the fluid input port 136 may be represented by a tubular member, or equivalent, extending proximally a bottom surface portion 614 of the fluid container 106, or is substantially in register with a top surface portion thereof, as illustrated in FIG. 32.

Furthermore, when the fluid container 106 is in the first position, the interior of the chamber 120 of the fluid container 106 is sealed from the interior of the bottle 300. And when the fluid container 106 is in the second position, at least one passageway extends throughout a bottom wall 164 of the fluid container 106 and throughout the bottle engaging element 104 respectively, such that the interior of the chamber 120 is in fluid communication with the interior of the bottle 300.

Figures 4, 5:
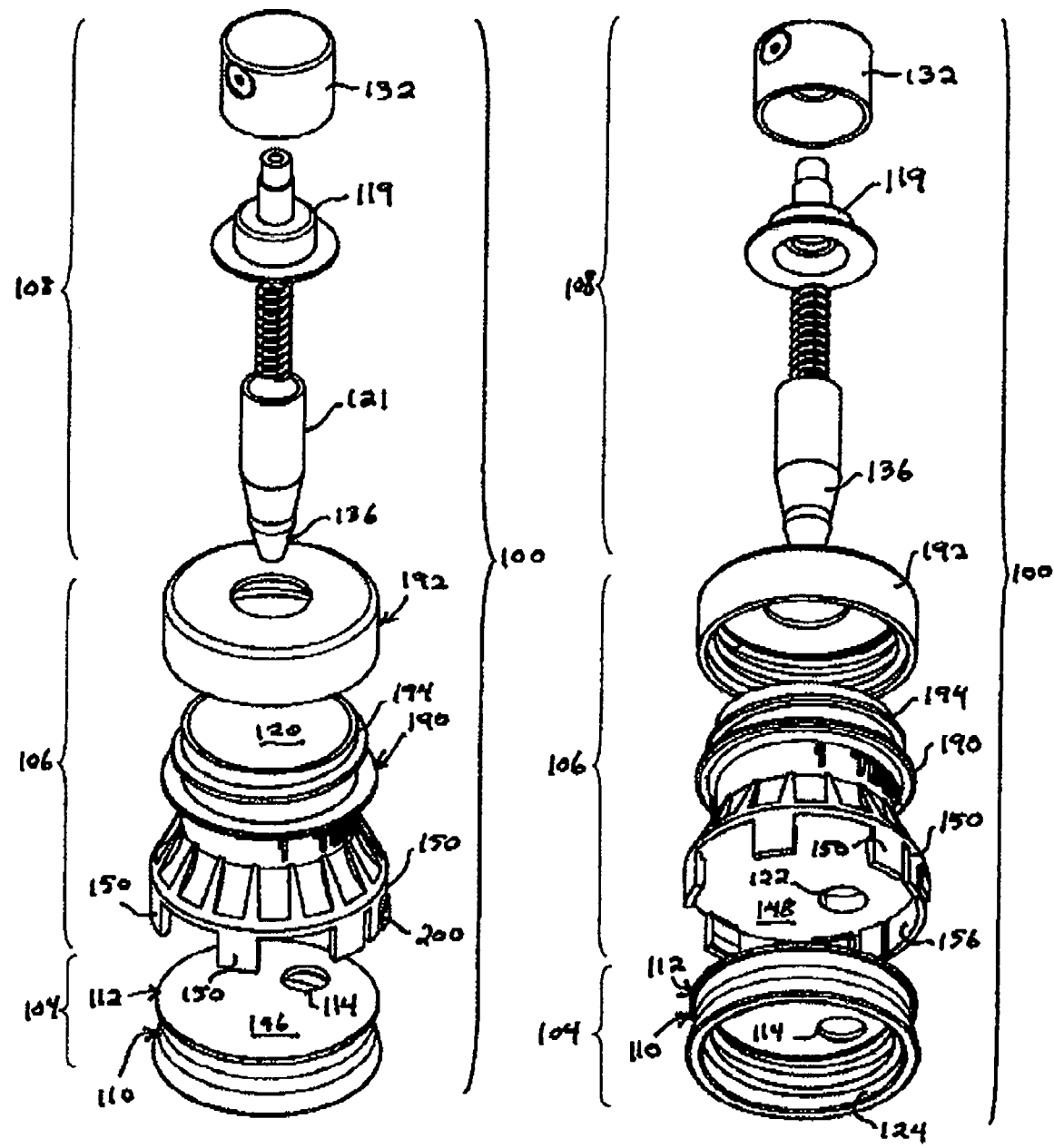
FIG. 4, in a top perspective, exploded view, illustrates the fluid metering and dispensing device in FIG. 1.
FIG. 5, in a bottom perspective, exploded view, illustrates the fluid metering and dispensing device in FIG. 1.
Figure 6:
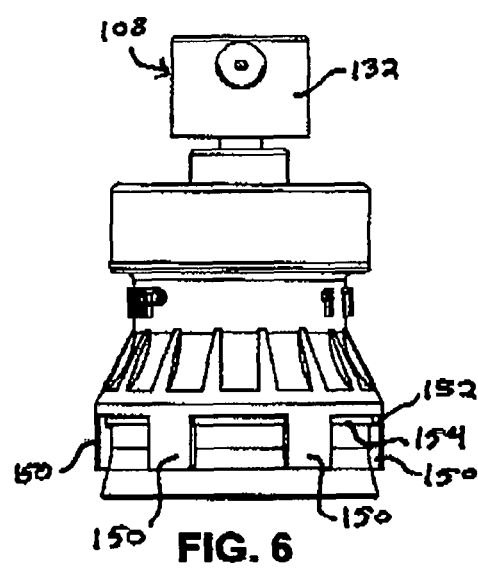
FIG. 6, in a front elevational view, illustrates the fluid metering and dispensing device in FIG. 1.
Figure 29:
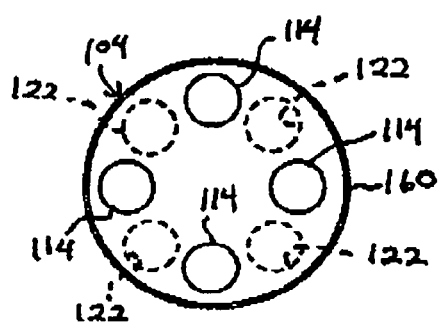
FIG. 29, in a top plan view, illustrates a bottle engaging element defining a plurality of fluid passageways, here shown in an offset, or first position, relative to passageways (in dotted lines) of the fluid container.

As best illustrated through in FIGS. 4, 5 and 29, a portion 122 of the passageway extends through the bottom wall 164 of the fluid container 106, and an other portion 114 of the passageway extends through a top portion 112 of the bottle engaging element 104.

Figure 7:
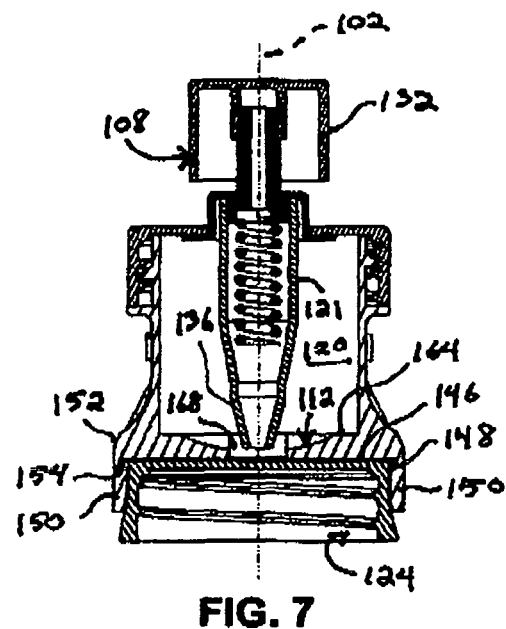
FIG. 7, in a front elevational, cross-sectional view, illustrates the fluid metering and dispensing device in FIG. 6.
Figure 8:
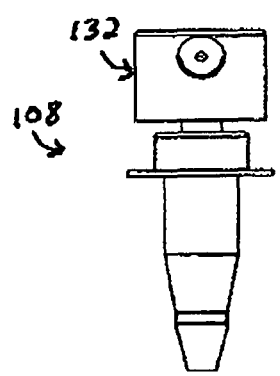
FIG. 8, in a front elevational view, illustrates a fluid dispensing means.
Figure 9:
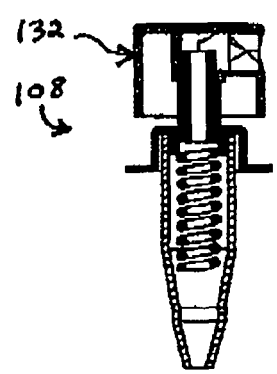
FIG. 9, in a side elevational, cross-sectional view, illustrates the fluid dispensing means in FIG. 8.

Preferably, as best illustrated in FIGS. 4, 5 and 7, oppositely facing surfaces 148 and 146 between the fluid container 106 and the bottle engaging element 104 respectively, each have correspondingly shaped and contacting coplanar surfaces which form a seal around each portion 122 and 114 of the passageway and the exterior of the device 100. Other correspondingly shaped configurations of the oppositely facing surfaces 148 and 146, between the fluid container 106 and the bottle engaging element 104 respectively, are also possible.

Preferably, the predetermined amount of fluid is equivalent to a table spoon. Other predetermined amounts of fluid are also possible such as, for example, one tea spoon, one fluid ounce and one centiliter.

In other embodiments of the invention, the amount of fluid that may be stored in the chamber 120 of the fluid container 106 is more than the predetermined volume of fluid described above, such as illustrated in FIGS. 31 and 32 in which, for example, more than one tea spoon or fluid ounce can be stored.

Figure 30:
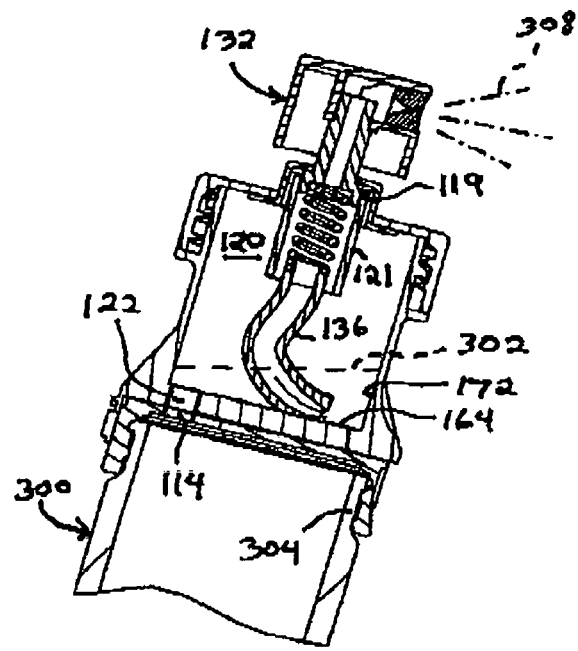
FIG. 30, in a side cross-sectional view, illustrates another embodiment of a fluid metering and dispensing device, according to the present invention, here shown engaged on the mouth of a bottle.

Referring to FIG. 7, in some embodiments of the invention, the fluid container 106 is rotably mounted to the bottle engaging element 104 along an axis of rotation 102 extending parallelly to an imaginary longitudinal axis of the mouth of the bottle, as best illustrated in FIGS. 30, 31 and 32.

As exemplified in the drawings, the axis of rotation 102 may be typically coaxially centered relative to an imaginary centered axis of the mouth of the bottle 300.

Furthermore, as best illustrated in FIGS. 5 and 29, the portions 122 and 114, respectively, of the at least one passageway extending through the bottom wall 164 of the fluid container 106 and through the top portion 112 of the bottle engaging element 104, are radially equidistantly spaced apart relative to the axis of rotation 102, and angularly equidistantly spaced apart relative to one another the equivalent distance of the diameter of the at least one passageway.

Preferably, as illustrated in the drawings, the portions 122 and 114 of the at least one passageway have a circular configuration and a same diameter.

Thus, when the fluid container 106 is in the first position, the respective portions 122 and 114 of the at least one passageway extending through the bottom wall 164 of the fluid container 106 and through the top portion 112 of the bottle engaging element 104 are angularly misaligned relative to one another around the axis of rotation 102, so as to block the fluid communication there through.

Furthermore, when the fluid container 106 is in the second position, the respective portion 122 and 114 of the at least one passageway extending through the bottom wall 164 of the container and through the top portion 112 of the bottle engaging element 104 are angularly aligned relative to one another around the axis of rotation 102, so as to allow the fluid communication there through.

Referring to FIGS. 1 to 7, and 10 to 17 inclusively, in some embodiments of the invention, the fluid container 106 is removably rotably mounted to the bottle engaging element 104 through a plurality of hook-shaped prongs 150 located in spaced apart relationship along a circular bottom edge of the fluid container 106 that is in proximity with a circular, peripheral lip edge 154 of the bottle engaging element 104.

Furthermore, the hook-shaped prongs 150 of the fluid container 106 are oriented inwardly and in a spring biased engagement against the circular lip edge 154 of the bottle engaging element 104, thus allowing a rotary movement of the fluid container 106 relative to the bottle engaging element 104 around the axis of rotation 102.

Thus, the fluid container 106 is selectively removable from the bottle engaging element 104 by manually biasing selected prongs 150 radially away from the circular lip edge 154 of the bottle engaging element 104.

Referring more particularly to FIGS. 10 to 21, preferably, the fluid container 106 further includes a pair of angularly spaced apart stop cavities 158 extending radially inwardly relative to an inner surface portion of one of the hook-shaped prongs 150.

Furthermore, the bottle engaging portion 104 further includes a stop protrusion 160 extending radially outwardly from an outer side surface portion thereof.

The pair of stop cavities 158, corresponding hook-shaped prong 150 and stop protrusion 160 are suitably configured and sized such that the stop protrusion 160 releasably engages in a respective one in the pair of stop cavities 158 when the fluid container 106 is in the first and second position, respectively, relative to the bottle engaging element 104.

Figure 10:
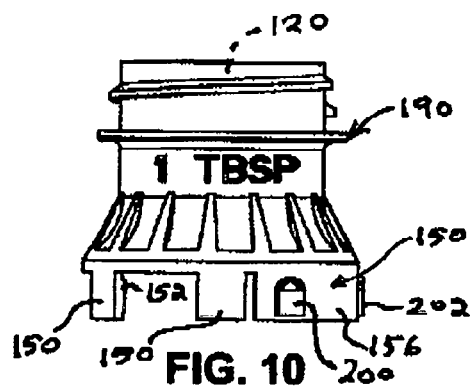
FIG. 10, in a first side elevational view, illustrates a fluid container having an open upper portion.
Figure 11:
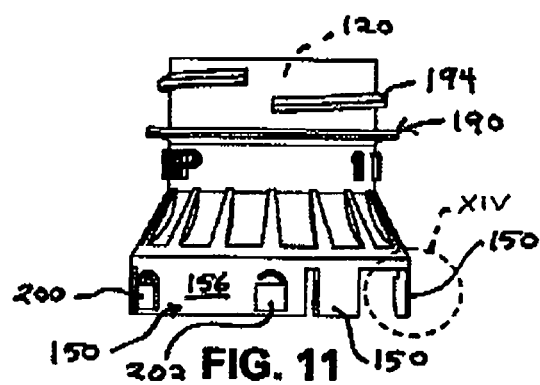
FIG. 11, in a second side elevational view, illustrates the fluid container in FIG. 10.

Further preferably, as best illustrated in FIGS. 10 and 11, indicia 200 and 202 located at suitable positions, for example, along outer surface portions of the corresponding hook-shaped prong 150, allows a user to recognize the position of the fluid container 106 relative to the bottle engaging element 104 when the fluid container is in the first and second position respectively.

Figure 12:
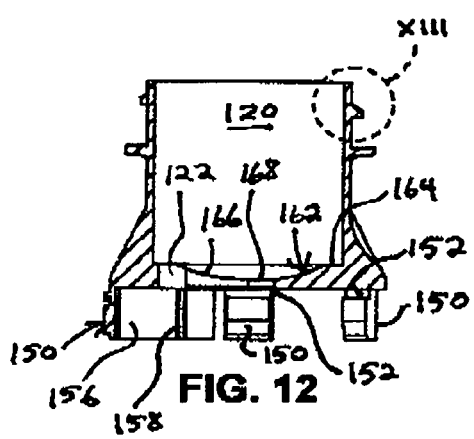
FIG. 12, in a side elevational, cross-sectional view taken from the opposite side of FIG. 10, illustrates the fluid container.
Figures 13, 14:
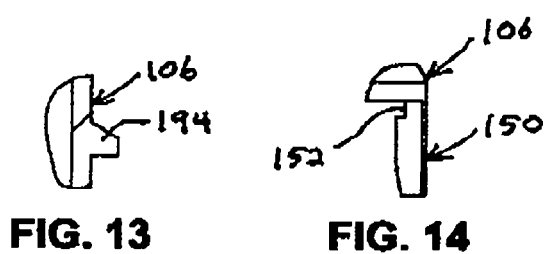
FIG. 13, in an enlarged view, illustrates a portion of the fluid container in FIG. 12 shown within section line XIII.
FIG. 14, in an enlarged view, illustrates a portion of the fluid container in FIG. 11 within section line XIV.
Figure 15:
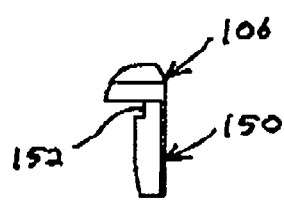
FIG. 15, in an enlarged view, illustrates a portion of the fluid container in FIG. 17 shown within section line XV.

Referring to FIGS. 7 and 12, in some embodiments of the invention, a bottom surface 112 of the chamber 120 has a shape configuration for channeling the fluid content of the fluid container 106 towards the aligned portions 122 and 114 of the at least one passageway when the fluid container 106 is in the second position relative to the bottle engaging element 104.

Preferably, as illustrated in FIGS. 7 and 12, the bottom surface 112 of the chamber 120 has a substantially conically shaped configuration extending centrally inwardly relative to the bottom wall 164 of the fluid container 106, so as to direct any remaining fluid content of the fluid container 106 proximally a lower end of the fluid input port 136.

Figure 16:
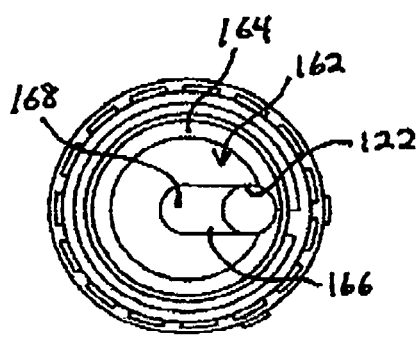
FIG. 16, in a top plan view, illustrates the fluid container in FIG. 10.
Figure 17:
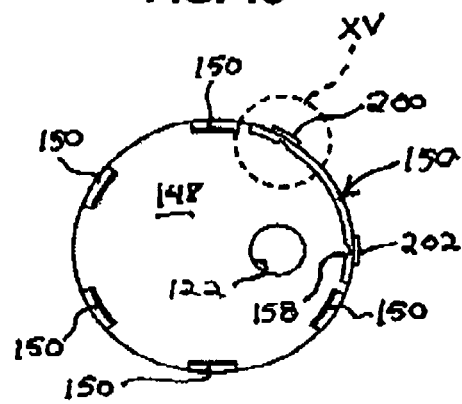
FIG. 17, in a bottom plan view, illustrates the fluid container, for example, in FIG. 10.
Figure 18:
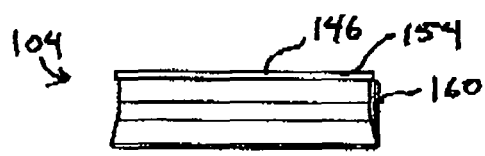
FIGS. 18, 19, 20 and 22, in a side elevational, front elevational, cross-sectional side and top plan views, illustrates a bottle engaging element.
Figure 19:
Figure 20:
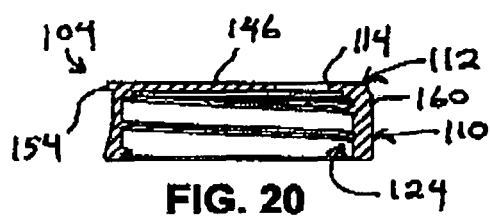
Figure 21:
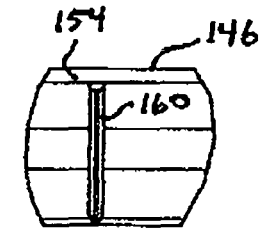
FIG. 21, in a front elevational, enlarged view, illustrates a stop protrusion defined along an outer surface portion of the bottle engaging element in FIG. 19.
Figure 22:
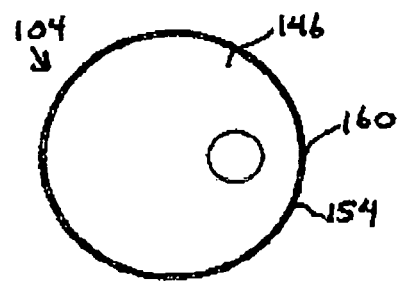
Figure 23:
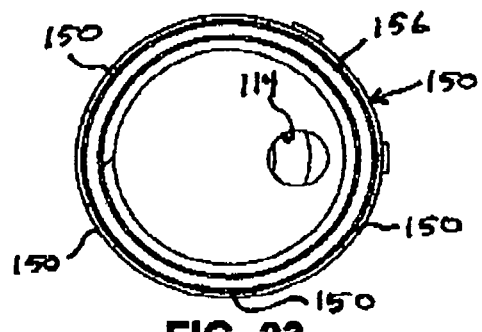
FIG. 23, in a bottom plan view, illustrates the bottle engaging element 104, here shown engaged with the fluid container in FIG. 10 (as seen through a fluid passageway of the fluid container)
Figure 24:
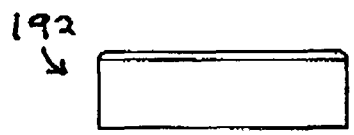
FIGS. 24, 25 and 26, in a side elevational, cross-sectional side and top plan views, illustrates a lid usable for closing the fluid container, for example, in FIG. 10.
Figure 25:
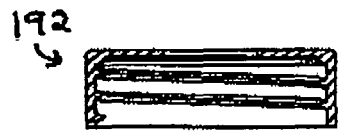
Figure 26:
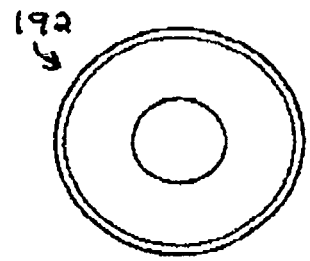

Furthermore, as illustrated in FIG. 16, a groove 166 extending laterally along the bottom surface 112, extend between the bottom end of the conically shaped configuration and the portion 122 of the passageway.

As best illustrated through FIGS. 5 and 29, in some embodiments of the invention, the at least one passageway comprises between one (1) and six (6) fluid passageways. Each portion 122 and 114 respectively of the at least one passageway extends throughout the bottom wall 164 of the fluid container 106 and correspondingly throughout the bottle engaging element 104, when the fluid container 106 is in the second position.

Advantageously, when the device 100 includes more than one passageway defined between the fluid container 106 and the bottle engaging portion 104, and the the fluid container 106 is in the second position, fluid can be transferred form the bottle 300 to the chamber 120 through some of the passageways there between, while air in the fluid container 106 is transferred, or vented, through the other passageways into the bottle 300. This aspect can significantly accelerate the transfer of fluid, particularly when the fluid is a viscous fluid such as olive oil or the like.

In some embodiments of the invention, as exemplified in FIGS. 31 and 32, the fluid container 106 is made of a transparent or translucent material so as to see the fluid content thereof.

Furthermore, in some embodiments of the invention, a longitudinal side wall 120 of the fluid container 106 is graded with fluid measuring indicia 180.

In some embodiments of the invention, as exemplified in FIGS. 1, 8, 9, 30 and 31, the fluid dispensing means 108 consist of a mist spray pump 132 or a trigger spray pump 134. Furthermore, the fluid input port 136 extends proximally the bottom portion of the chamber 120.

In some other embodiments of the invention, as illustrated in FIG. 32, the fluid dispensing means 108 is an olive oil pourer spout 138 including a vent tube 140 and a removable stopper cap 144.

Figure 27:
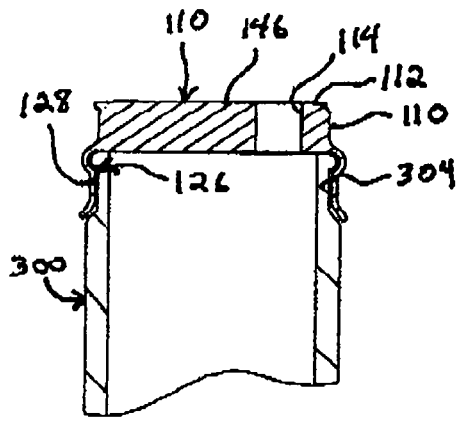
FIG. 27, in a partial side cross-sectional view, illustrates an embodiment of a sealing cap-type, bottle engaging element sealably engaged on a ringed mouth of a bottle.
Figure 28:
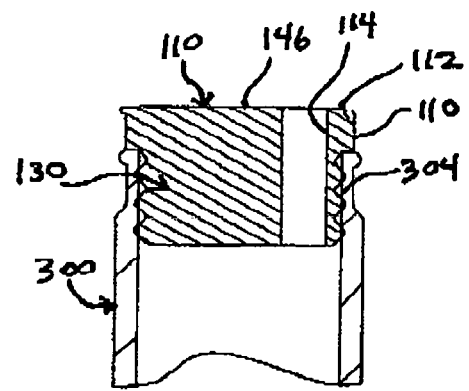
FIG. 28, in a partial side cross-sectional view, illustrates another embodiment of a cork-type bottle engaging element sealably engaged in the mouth of a bottle.

In some embodiments of the invention, the bottom portion of the bottle engaging element 104 has one of a) a threaded cap 124 configuration for sealably engaging a threaded finish of the bottle 300 (as best illustrated in FIGS. 5 and 7), b) a sealing cap-type configuration 126 for sealably engaging a ringed mouth configuration of the bottle 300 (as illustrated in FIG. 27), or c) a cork-type bottle plug 130 for sealably engaging the opening of the mouth of the bottle 300 (as illustrated in FIG. 28).

In some embodiments of the invention, as best illustrated in FIGS. 3, 4, 7 and 11, the fluid container 106 is removably mounted to the bottle engaging element 104, the fluid dispensing means 108 is removably mounted to the fluid container 106, and the fluid container 106 includes a removable cap 192 threadedly engaged on a threaded top edge portion 194 of the fluid container 106, for allowing a user to thoroughly wash the inner and outer surfaces of the device 100.

A method of measuring and dispensing a fluid from a bottle 300 having a fluid measuring and dispensing device 100 sealably engaged on the mouth of the bottle 300 will now be described.

The method comprises, in a first step, moving a fluid container 106 of the device 100 from a first position to a second position relative to a bottle engaging element 104 of the device 100.

In a second step, orienting and holding the bottle 300 substantially upside down until a predetermined amount of fluid is transferred by gravity from the bottle 300 into the fluid container 106.

In a third step, moving the fluid container 106 back to the first position.

In a fourth step, dispensing the predetermined amount of fluid in the fluid container 106 via a fluid dispensing means 108 of the device 100.

In some embodiments, the method further includes between the third and fourth steps a step of orienting the bottle 300 substantially upright.

Furthermore, in the fourth step, dispensing the predetermined amount of fluid includes actuating the fluid dispensing means 108.

In some embodiments of the method, after orienting the bottle substantially upright and before dispensing the predetermined amount of fluid, the method further includes a step of moving the fluid container 106 from the first position to the second position a sufficient period of time, and then back to the first position, so as to allow any amount of fluid exceeding the predetermined amount of fluid to flow back down by gravity into the bottle.

Thus, any exceeding amount of fluid contained in the fluid container 106 may be corrected to the predetermined amount of fluid before dispensing the latter.

Although the above description contains many specificities, these should not be construed as limitations on the scope of the invention but is merely representative of the presently preferred embodiments of this invention.

What is claimed is:

1. A fluid measuring and dispensing device for use with a bottle containing a fluid, the device comprising:
   a bottle engaging element having a bottom portion configured for removably sealably engaging the mouth of the bottle;
   a fluid container defining a fluid chamber dimensioned for containing a predetermined amount of fluid to be dispensed, and is movably mounted on a top portion of the bottle engaging element,
      wherein the fluid container is movable between a first position and a second position relative to the bottle engaging element;
   a fluid dispensing means connected to the fluid container and having a fluid input port in fluid communication with the chamber of the fluid container;
   whereby, when the fluid container is in the first position, the interior of the chamber of the fluid container is sealed from the interior of the bottle, and when the fluid container is in the second position, at least one passageway extends throughout a bottom wall of the fluid container and throughout the bottle engaging element respectively, such that the interior of the chamber is in fluid communication with the interior of the bottle;
   the fluid container is rotably mounted to the bottle engaging element along an axis of rotation extending parallelly to an imaginary longitudinal axis of the mouth of the bottle, and
      each portion of the at least one passageway extending through the bottom wall of the fluid container and through the bottle engaging element respectively, are radially equidistantly spaced apart relative to the axis of rotation, and angularly equidistantly spaced apart relative to one another the equivalent distance of the diameter of the at least one passageway,
      wherein:
         when the fluid container is in the first position, the respective portion of the at least one passageway extending through the bottom wall of the fluid container and through the bottle engaging element are angularly misaligned relative to one another around the axis of rotation, so as to block the fluid communication there through, and
         when the fluid container is in the second position, the respective portion of the at least one passageway extending through the bottom wall of the container and through the bottle engaging element are angularly aligned relative to one another around the axis of rotation, so as to allow the fluid communication there through;
   the fluid container is removably rotably mounted to the bottle engaging element through a plurality of hook-shaped prongs located in spaced apart relationship along a circular bottom edge of the fluid container that is in proximity with a circular, peripheral lip edge of the bottle engaging element, and
      the hook-shaped prongs of the fluid container are oriented inwardly and in a spring biased engagement against the circular lip edge of the bottle engaging element, thus allowing a rotary movement of the fluid container relative to the bottle engaging element around the axis of rotation,
      wherein the fluid container is selectively removable from the bottle engaging element by manually biasing selected prongs radially away from the circular lip edge of the bottle engaging element;
   a bottom surface of the chamber having a shape configuration for channeling the fluid content of the fluid container towards the at least one passageway when the fluid container is in the second position;
   the at least one passageway comprises between one and six fluid passageways, which extend throughout the bottom wall of the fluid container and correspondingly throughout the bottle engaging element, when the fluid container is in the second position;
   the fluid dispensing means consist of a mist spray pump, and the fluid input port extends proximally the bottom portion of the chamber;
   the fluid container is removably mounted to the bottle engaging element, the mist spray pump is removably mounted to the fluid container, and the fluid container includes a removable cap, for washing of the device.

* * * * *